(12) United States Patent
Erl et al.

(10) Patent No.: US 8,210,543 B2
(45) Date of Patent: Jul. 3, 2012

(54) SEAL FOR A BUSHING

(75) Inventors: Andreas Erl, Henningsdorf (DE); Michael Ebert, Berlin (DE); Majid Djahani, Potsdam (DE)

(73) Assignee: Carl Freudenberg KG, Weinheim (DE)

( * ) Notice: Subject to any disclaimer, the term of this patent is extended or adjusted under 35 U.S.C. 154(b) by 245 days.

(21) Appl. No.: 12/456,183

(22) Filed: Jun. 12, 2009

(65) Prior Publication Data
US 2009/0309314 A1   Dec. 17, 2009

(30) Foreign Application Priority Data
Jun. 13, 2008  (DE) .................. 10 2008 028 115

(51) Int. Cl.
*F16J 15/00* (2006.01)
(52) U.S. Cl. ...................................... 277/585
(58) Field of Classification Search .............. 277/561, 277/572, 574, 585
See application file for complete search history.

(56) References Cited

U.S. PATENT DOCUMENTS

| | | | | |
|---|---|---|---|---|
| 2,997,318 A * | 8/1961 | Lansky et al. | ......... | 277/558 |
| 3,468,171 A * | 9/1969 | Macielinski | ......... | 277/634 |
| 3,948,574 A * | 4/1976 | Baylor | ......... | 305/103 |
| 4,156,532 A * | 5/1979 | Kawaguchi et al. | ......... | 277/587 |
| 4,228,726 A * | 10/1980 | Rinker et al. | ......... | 92/168 |
| 4,304,416 A * | 12/1981 | Oshima | ......... | 277/561 |
| 4,537,289 A * | 8/1985 | VonGrunberg et al. | ...... | 188/72.4 |
| 4,809,821 A * | 3/1989 | Fulmer | ......... | 188/72.4 |
| 4,981,308 A | 1/1991 | Kunert et al. | ......... | 280/661 |
| 5,137,285 A * | 8/1992 | Pick | ......... | 277/503 |
| 5,626,520 A * | 5/1997 | Mazziotti | ......... | 464/131 |
| 6,224,046 B1 * | 5/2001 | Miyamoto | ......... | 267/281 |
| 6,264,206 B1 * | 7/2001 | Hashizawa et al. | ......... | 277/641 |
| 6,298,955 B1 * | 10/2001 | Frost | ......... | 188/72.9 |
| 6,644,633 B2 | 11/2003 | Graeve | | |
| 7,097,004 B2 * | 8/2006 | Barrett et al. | ......... | 188/72.4 |
| 7,189,162 B2 * | 3/2007 | Menosky et al. | ......... | 464/14 |
| 8,028,998 B2 * | 10/2011 | Schleker et al. | ......... | 277/551 |
| 2006/0220323 A1 * | 10/2006 | Frostick et al. | ......... | 277/500 |

FOREIGN PATENT DOCUMENTS

| | | |
|---|---|---|
| DE | 37 40 310 | 6/1989 |
| DE | 100 24 536 | 11/2001 |
| DE | 102 20 219 | 11/2003 |
| EP | 0 656 271 | 6/1995 |
| EP | 1 282 788 | 11/2004 |
| JP | 1275926 | 11/1989 |
| JP | 2001-275826 | 10/2001 |

OTHER PUBLICATIONS

"bushing." Merriam-Webster.com. 2011. http://www.merriam-webster.com/dictionary/bushing?show=0&t=1307036636. (Jun. 2, 2011).*

* cited by examiner

*Primary Examiner* — Vishal Patel
(74) *Attorney, Agent, or Firm* — Pearl Cohen Zedek Latzer, LLP

(57) ABSTRACT

A bushing, including a core, a sleeve that surrounds the core and a spring element that is arranged between the core and the sleeve, wherein, on at least one face of the bushing, there is a sealing element that seals the spring element vis-à-vis the environment.

7 Claims, 2 Drawing Sheets

SEAL FOR A BUSHING

Priority is claimed to German Patent Application DE 10 2008 028 115.8, filed Jun. 13, 2008 which is hereby incorporated by reference herein.

The invention relates to a bushing, comprising a core, a sleeve surrounding the core and a spring element that is arranged between the core and the sleeve.

BACKGROUND OF THE INVENTION

Bushings of this type are generally known. For instance, German patent application DE 102 20 219 B4 discloses a cylindrical bushing that has a core and a sleeve between which a spring element is arranged. In the non-load state, the spring element has a larger radial extension than after it has been installed. As a result, after its installation, the spring element exhibits a high radial bias. Such bushings have the advantage that they have a high radial stiffness with a concurrently low torsional stiffness. Owing to the high bias, it is not necessary to connect the spring element to the core or to the sleeve by a bonded joint. Especially in the case of relative movements between the exposed surface of the spring element and the core or the sleeve, however, dirt can penetrate and damage the surface. In view of the high bias, this surface damage can result in deeper damage to the spring element, thus causing premature wear and tear of the bushing.

SUMMARY OF THE INVENTION

The invention is based on the objective of refining the bushing in such a way that the spring element is protected against the penetration of dirt.

This objective may be achieved by a bushing, comprising a core, a sleeve that surrounds the core and a spring element that is arranged between the core and the sleeve, characterized in that, on at least one face of the bushing, there is a sealing element that seals the spring element vis-à-vis the environment. Advantageous embodiments will be elaborated upon in the subordinate claims.

In order to achieve this objective, a sealing element is arranged on at least one face of the bushing, said sealing element sealing the spring element vis-à-vis the environment. This sealing element prevents dirt particles from penetrating into the space between the core and the sleeve, something that could otherwise cause damage, especially to the areas where the spring element is joined to the core and the sleeve. This is particularly advantageous when the spring element is not connected to the core or sleeve by a bonded joint, and the spring element is under radial bias only because of strong compression that clamps it between the core and the sleeve. In this case, especially if relative movements occur, dirt could penetrate between the spring element and the adjacent surfaces and damage the material of the spring element, thereby causing premature wear and tear. The sealing element seals the spring element vis-à-vis the environment. Here, the sealing element is configured in such a way that it only offers a slight resistance to the movements for which the bushing is designed. Thus, for instance, a bushing having a radially compressed spring element is preferably configured for movements in the rotational direction as well as in the axial direction, and it is quite soft in these directions. In the radial direction, however, such a bushing is hard because of the bias on the spring element. Accordingly, the sealing element for such a bushing is configured in such a way that it executes relative movements with low resistance between the core and the sleeve in the rotational direction as well as in the axial direction.

The sealing element can have a first sealing section and a second sealing section, whereby the first sealing section lies against the core so as to create a seal, while the second sealing section lies against the sleeve so as to create a seal. When the core and the sleeve have a cylindrical design, the sealing section lies over the entire surface so as to create a seal against the inner circumference of the sleeve and against the outer circumference of the core, thereby creating a secure seal. Furthermore, the sealing element can be largely integrated into the bushing, so that very little changes in terms of the overall dimensions of the bushing.

The first sealing section and the second sealing section can be joined to each other by means of a web. The web is a thin-walled part that, depending on the orientation, allows a high degree of flexibility of the relative movement of the two sealing sections. The web can be configured as a bellows, as a result of which it is particularly flexible in the radial direction.

The web can be configured in such a way that the sealing element has a Z-shaped configuration as seen in a cross section. This means that the web is oblique with respect to the two sealing sections and runs, for example, from one face to the other face. This yields a high degree of flexibility of the sealing element, especially in the rotational direction.

A support element can be associated with the first sealing section and/or with the second sealing section. This translates into a higher stability of the sealing element. The support rings can be configured in such a way that the sealing element lies with a high bias against the core and the sleeve.

The sealing surfaces associated with the sealing sections can be provided with profiling. The profiling improves the sealing effect of the sealing element.

The sealing element can extend onto the face of the core. This results in a stop function by means of which it is particularly easy to install the sealing element.

The support element associated with the core can have an L-shaped configuration. Here, one section of the support element comes into contact with the face of the core directly or indirectly, thereby forming an encircling stop for the sealing element.

The sealing element can be provided with a stop contour on the face that is facing away from the core. The stop contour can be formed by a ring-shaped bead or by elevations distributed along the circumference, and it is made of an elastomeric material. The stop contour can be brought into contact with a component mounted on the core, whereby the stop is very gentle on the material since it is made of elastomer.

The sealing element can have a protruding sealing lip on the face that is facing away from the core. The sealing lip can be brought into contact with an adjacent component, for instance, with a component mounted on the core, and it prevents dirt from penetrating into the space between the bushing and the component.

BRIEF DESCRIPTION OF THE DRAWINGS

Several embodiments of the bushing according to the invention will be explained below making reference to the figures. These schematically show the following.

DETAILED DESCRIPTION

Figure 1:
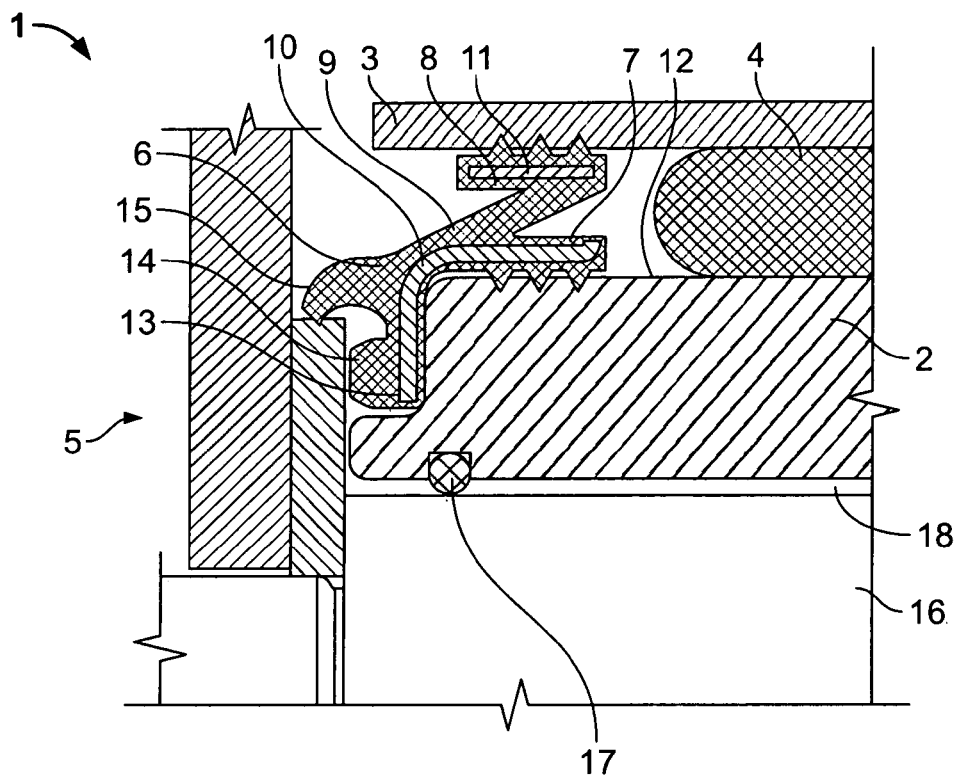
FIG. 1 shows a bushing with a sealing element.

FIG. 1 shows a bushing 1, configured here as an elastomeric articulated joint for use in general mechanical engineering, in drive technology or in automotive technology. Such articulated joints serve as bushings for collapsible booths, housing covers, levers, linkages, motor rockers, oscillating screens or vibrating tables. The bushing 1 consists of a core 2, a sleeve 3 that surrounds the core 2, and a spring element 4 that is arranged between the core 2 and the sleeve 3. In this embodiment, the spring element 4 in its non-load state has a smaller axial extension and a larger radial extension than after its installation between the core 2 and the sleeve 3. As a result, the spring element 4 is strongly compressed in the radial direction and is thus particularly stiff in the radial direction, with a concurrently reduced stiffness in the axial direction as well as in the rotational direction. Owing to the high bias of the spring element 4, it is not necessary to connect the spring element 4 to the core 2 or to the sleeve 3 by a bonded joint. A sealing element 6 that seals the sealing element 4 vis-à-vis the environment is arranged on both faces 5 of the bushing 1. In this context, the sealing element is arranged in the concentric gap between the core 2 and the sleeve 3, as a result of which the axial extension of the bushing 1 remains unchanged. The sealing element 6 has a first sealing section 7 and a second sealing section 8, whereby the first sealing section 7 lies so as to create a seal against the outer circumference of the core 2, while the second sealing section 8 lies so as to create a seal against the inner circumference of the sleeve 3. The first sealing section 7 and the second sealing section 8 are joined to each other by a web 9, whereby the web 9 is configured in such a way that the sealing element 6 has a Z-shaped configuration as seen in a cross section. A support element 10, 11 is associated with the first sealing section 7 and with the second sealing section 8, respectively, and the sealing surfaces associated with the sealing sections 7, 8 are provided with profiling 12. The support element 10 associated with the core 2 has an L-shaped configuration, as a result of which the sealing element 6 extends to the face 13 of the core 2. On the face that is facing away from the core 2, the sealing element 6 is provided with a stop contour 14 and the sealing element 6 has a protruding sealing lip 15 on the face that is facing away from the core 2. For purposes of installing the bushing 1, the core 2 is slid onto a journal or pin 16 and attached there. The attachment can be effectuated in such a way that the core 2 can rotate freely on the pin 16. For this purpose, the space between the core 2 and the pin 16 can be filled with a lubricant, for instance, grease. An advantageous aspect of a freely rotating bushing is that the spring element 4 is free of torsional loads that could lead to an overload of the spring element 4. In the present embodiment, the inner circumference of the core 2 is provided with a friction-reducing coating 18. In order to prevent particles and other dirt from penetrating into the space between the core 2 and the pin 16, the gap is closed off by another sealing element 17. This additional sealing element 17 is configured here as an O-ring that is arranged in a groove in the core 2.

Figure 2:
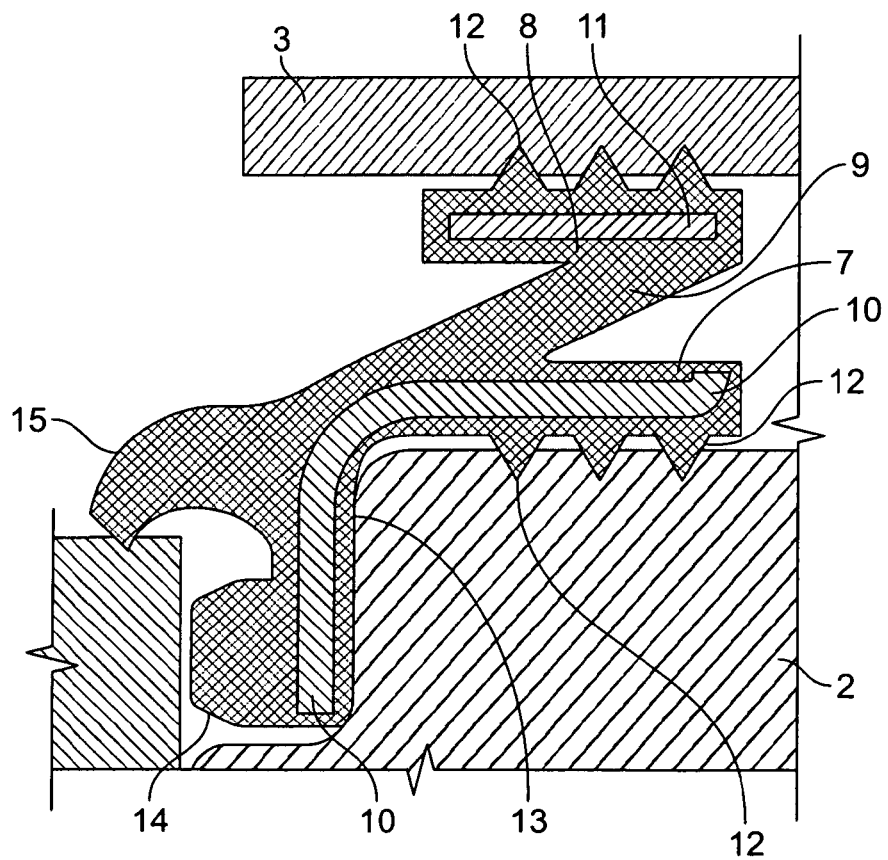
FIG. 2 shows a detailed view of the sealing element shown in FIG. 1.

FIG. 2 shows a detailed view of the sealing element 6 depicted in FIG. 1.

Figure 3:
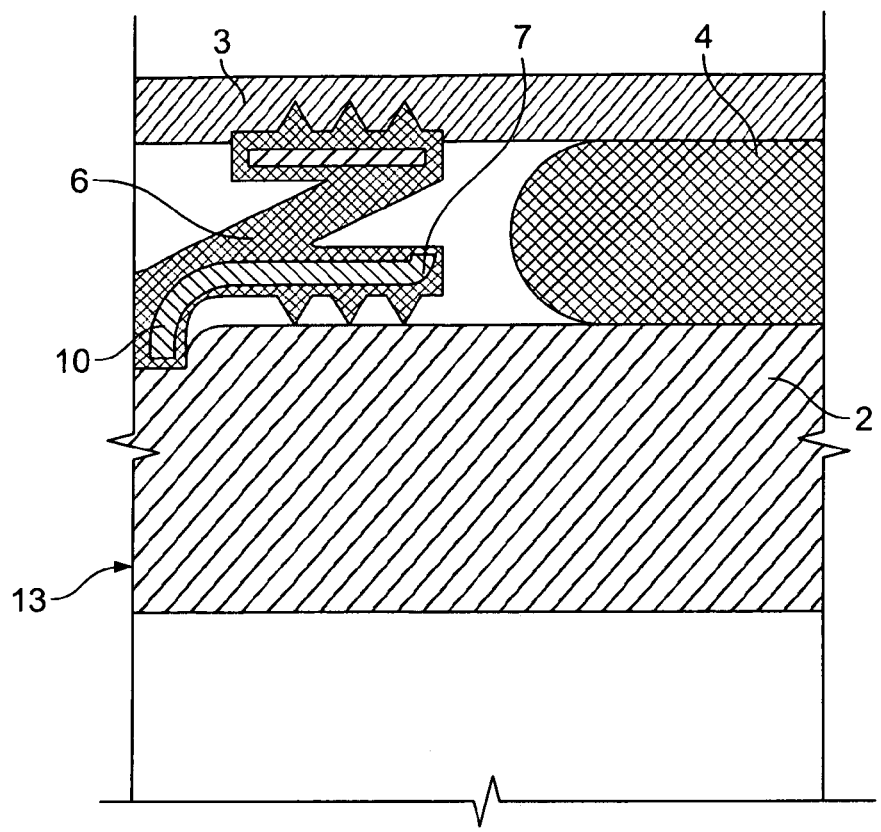
FIG. 3 shows a bushing with a sealing element.

FIG. 3 shows a bushing as depicted in FIG. 1, whereby the leg of the support element is associated with the core 2 and extends in the radial direction, said leg being configured to be short so that it has a stop function for installing the sealing element 6 on the core 2. In this embodiment, however, neither a stop contour not a sealing lip is provided.

Figure 4:
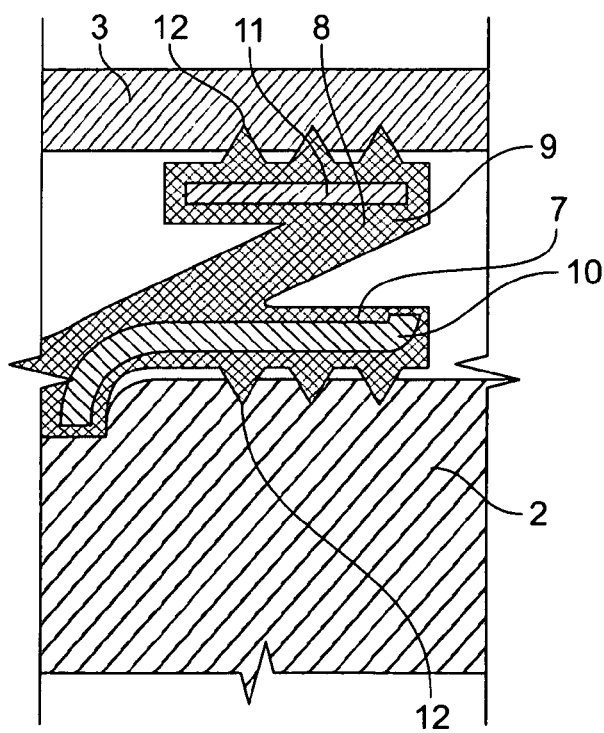
FIG. 4 is a detailed view of the sealing element shown in FIG. 3.

FIG. 4 shows a detailed view of the sealing element 6 depicted in FIG. 3.

The invention claimed is:

1. A bushing assembly, comprising
a hollow annular core element adapted to surround a pin or shaft,
an annular sleeve that surrounds the core element,
a spring element that is arranged between the core element and the sleeve, and
on at least one face of a member of the bushing assembly, a sealing element having a Z-shape as seen in cross-section sandwiched between, and positioned against both the core element and the sleeve that seals the spring element vis-a-vis the environment, the sealing element having a portion that extends around a face of the core element corresponding to the at least one face of said member and a sealing lip that extends axially and radially outward from said portion and contacts the at least one face of said member.

2. The bushing assembly according to claim 1, wherein said Z-shape comprises a first sealing section positioned against the core element so as to create a seal, and a second sealing section, positioned against the sleeve so as to create a seal.

3. The bushing assembly according to claim 2, wherein the sealing element further comprises a web which joins the first sealing section to the second sealing section.

4. The bushing assembly according to claim 2, wherein a support element is provided for both of the first sealing section and the second sealing section.

5. The bushing assembly according to claim 2, wherein the first sealing section and the second sealing section each has a sealing surface provided with profiling.

6. The bushing assembly according to claim 2,
wherein the sealing element extends onto a face of the core element, and
a support element having a L-shaped configuration is provided in the first sealing section.

7. The bushing assembly according to claim 1, wherein the sealing element has a stop contour on the at least one face of the bushing assembly that is facing away from the core element.

* * * * *